United States Patent
Okugawa et al.

(10) Patent No.: US 10,059,085 B2
(45) Date of Patent: Aug. 28, 2018

(54) WOUND BODY OF POROUS FILM, AND MANUFACTURING METHOD THEREOF

(71) Applicant: Sumitomo Chemical Company, Limited, Tokyo (JP)

(72) Inventors: Takahiro Okugawa, Niihama (JP); Yutaka Suzuki, Tsukuba (JP); Tomoaki Ozeki, Niilhama (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/316,972

(22) PCT Filed: Aug. 28, 2015

(86) PCT No.: PCT/JP2015/074536
§ 371 (c)(1),
(2) Date: Dec. 7, 2016

(87) PCT Pub. No.: WO2016/031990
PCT Pub. Date: Mar. 3, 2016

(65) Prior Publication Data
US 2017/0173927 A1    Jun. 22, 2017

(30) Foreign Application Priority Data

Aug. 29, 2014    (JP) .................................. 2014-175485

(51) Int. Cl.
*H01M 2/14*    (2006.01)
*H01M 2/16*    (2006.01)
(Continued)

(52) U.S. Cl.
CPC .......... *B32B 27/32* (2013.01); *B29C 37/0025* (2013.01); *C08J 5/18* (2013.01);
(Continued)

(58) Field of Classification Search
CPC ........... H01M 2/14; H01M 2/16; B32B 27/32; B32B 2250/242; B32B 2307/306; B32B 2307/538; B29C 37/0025; C08J 5/18
See application file for complete search history.

(56) References Cited

U.S. PATENT DOCUMENTS

| 2011/0052962 | A1 | 3/2011 | Suzuki et al. | |
| 2012/0164538 | A1* | 6/2012 | Inagaki | H01M 2/1653 429/249 |

(Continued)

FOREIGN PATENT DOCUMENTS

| JP | H06048059 A | 2/1994 |
| JP | H0729563 A | 1/1995 |

(Continued)

OTHER PUBLICATIONS

J-PlatPat machine translation of the detailed description of JP 2001-316006A (Nov. 2001). (Year: 2001).*

(Continued)

*Primary Examiner* — Gregg Cantelmo
(74) *Attorney, Agent, or Firm* — Panitch Schwarze Belisario & Nadel LLP

(57) ABSTRACT

A roll is made of a porous film in a belt-like shape, the porous film having a width of not smaller than 20 mm. In a case where a roughness along a width direction of an outermost surface of the roll is measured at 1 mm intervals across an entire width of the outermost surface, a difference between a maximum roughness value and a minimum roughness value in a distance of 20 mm in the width direction of the outermost surface is less than 25 μm.

7 Claims, 4 Drawing Sheets

(51) Int. Cl.
  *B32B 27/32* (2006.01)
  *B29C 37/00* (2006.01)
  *C08J 5/18* (2006.01)
(52) U.S. Cl.
  CPC ............... *H01M 2/14* (2013.01); *H01M 2/16* (2013.01); *B32B 2250/242* (2013.01); *B32B 2307/306* (2013.01); *B32B 2307/538* (2013.01)

(56) References Cited

U.S. PATENT DOCUMENTS

| | | | |
|---|---|---|---|
| 2014/0120334 A1 | 5/2014 | Harada et al. | |
| 2014/0349168 A1 | 11/2014 | Yashiki et al. | |
| 2015/0004466 A1 | 1/2015 | Yashiki et al. | |

FOREIGN PATENT DOCUMENTS

| | | | |
|---|---|---|---|
| JP | H09003227 A | | 1/1997 |
| JP | 2001-316006 A | | 11/2001 |
| JP | 2001316006 A | * | 11/2001 |
| JP | 2002-60102 A | | 2/2002 |
| JP | 3597224 B2 | | 12/2004 |
| JP | 2009-197096 A | | 9/2009 |
| JP | 2009-205959 A | | 9/2009 |
| JP | 2013091560 A | | 5/2013 |
| KR | 2014-0053093 A | | 5/2014 |
| WO | 2011024849 A1 | | 3/2011 |
| WO | 2013/080701 A1 | | 6/2013 |
| WO | 2013/118638 A1 | | 8/2013 |
| WO | 2013172249 A1 | | 11/2013 |

OTHER PUBLICATIONS

Int'l Search Report dated Nov. 24, 2015 in Int'l Application Np. PCT/JP2015/074536.
Office Action: Decision of Refusal dated Mar. 29, 2016 in JP 2015-544244.
Office Action dated Nov. 24, 2015 in JP Application No. 2015-544244.
Office Action dated Aug. 10, 2016 in KR Application No. 10-2016-7013979.
Office Action dated Dec. 21, 2016 in KR Application No. 10-2016-7013979.
Office Action dated Sep. 25, 2017 in CN Application No. 201580037479.9.
Office Action dated Feb. 11, 2018 in CN Application No. 2015-80037479.9.
Office Action dated May 24, 2018 in CN Application No. 2015-80037479.9.

* cited by examiner

TO NEXT PROCESS

TO WINDING PROCESS    FEED COATED FILM

WOUND BODY OF POROUS FILM, AND MANUFACTURING METHOD THEREOF

CROSS-REFERENCE TO RELATED APPLICATION

This application is a Section 371 of International Application No. PCT/JP2015/074536, filed Aug. 28, 2015, which was published in the Japanese language on Mar. 3, 2016, under International Publication No. WO 2016/031990 A1, and the disclosure of which is incorporated herein by reference.

TECHNICAL FIELD

The present invention relates to a roll made of a porous film, and a method for producing the roll.

BACKGROUND ART

Nonaqueous electrolyte secondary batteries, such as a lithium secondary battery, are currently in wide use as batteries for devices such as a personal computer, a mobile telephone, and a portable information terminal.

Such a nonaqueous electrolyte secondary battery, typified by a lithium secondary battery, has a high energy density and may thus let a large current flow and generate heat in a case where a breakage in the battery or in a device using that battery has caused an internal or external short circuit. This risk has created a demand that a nonaqueous electrolyte secondary battery should prevent more than a certain level of heat generation, so as to ensure a high level of safety.

Safety of a nonaqueous electrolyte secondary battery is typically ensured by imparting a shutdown function to a nonaqueous electrolyte secondary battery. The shutdown function blocks passage of ions between a cathode and an anode with use of a separator so that further heat generation will be prevented, in a case where abnormal heat generation has occurred. More specifically, a nonaqueous electrolyte secondary battery typically includes a separator between a cathode and an anode, which separator has a function of, in a case where, for example, an internal short circuit between the cathode and the anode has caused an abnormal current to flow through the battery, blocking that current and preventing a flow of an excessively large current (shutdown) so that further heat generation will be prevented. The shutdown is performed such that in a case where a nonaqueous electrolyte secondary battery has been heated to a temperature over a normal operating temperature, a separator is melted by heat and thereby pores of the separator are clogged. It is preferable that after the shutdown, the separator not be broken by heat even in a case where a temperature inside the battery has reached a relatively high temperature, but maintain a shutdown state.

The separator is typically made of a porous film that contains, as a main component, a polyolefin, which melts at, for example, approximately 80° C. to 180° C. in a case where abnormal heat generation has occurred. However, a separator made of such a porous film has insufficient shape stability at high temperatures. This poses a risk that even in a case where the shutdown function is performed, the occurrence of shrinkage, breakage of the film, or the like may bring a cathode and an anode into direct contact with each other, and may consequently lead to an internal short circuit. That is, a separator made of the porous film may not be able to sufficiently prevent abnormal heat generation caused by an internal short circuit. This risk has created a demand for separators that are capable of ensuring a higher level of safety.

For example, Patent Literature 1 proposes, as a porous film having an excellent heat resistance, a porous film including a polyolefin microporous film and a heat-resistant porous layer which is made of an aromatic polymer such as aromatic polyamide and is stacked on the polyolefin microporous film.

A nonaqueous electrolyte secondary battery, such as a lithium secondary battery, is a battery that may burn because it contains a flammable organic electrolyte. Thus, in view of improper use by a user and use under a severe environment, various safety standards have been developed and various safety tests have been performed.

Examples of such safety standards include an IEC standard (developed by the International Electrotechnical Commission), a UL standard (developed by Underwriters Laboratories Inc.), and a JIS standard.

Examples of the safety tests include an electrical test (external short-circuit test, overcharging test, etc.), an environmental test (low-pressure test, heating test, etc.), and a mechanical test (crush test, drop test, etc.).

More specifically, a nail penetration test is an example of a test for evaluating an internal short circuit, which is a possible cause of a lithium-ion battery accident. In the nail penetration test, a nail is caused to penetrate a battery so as to artificially cause an internal short circuit, and safety of the battery (e.g., presence of heat generation, ignition, smoking, and bursting) is evaluated.

CITATION LIST

Patent Literature

[Patent Literature 1]
Japanese Patent Application Publication, Tokukai, No. 2009-205959 (Publication Date: Sep. 10, 2009)

SUMMARY OF INVENTION

Technical Problem

However, there has been a demand for further improvement in safety of batteries.

The present invention is attained in view of the above problem. An object of the present invention is to provide a separator that makes it possible to provide a safer battery.

Solution to Problem

In view of the above object, the inventors of the present invention made diligent studies, and as a result, accomplished the present invention by finding the following (a) through (c):

(a) It is possible to produce a highly safe battery (particularly, a battery that is highly safe in a case where an internal short circuit has occurred) by using, as a separator, a roll that is made of a porous film and has an outermost surface with small roughness.

(b) It is possible to produce a porous film having small roughness, by applying, to a material film of the porous film, a tensile force in a width direction during production of the porous film. Further, it is possible to produce a roll having an outermost surface with small roughness, by using the above porous film.

(c) For production of a porous film having small roughness, there is a preferable combination of: a property of a material film of the porous film; a method for forming a coating layer; and a method for applying a tensile force to the material film.

In order to achieve the above object, a roll of an embodiment of the present invention is a roll that is made of a porous film in a belt-like shape, the porous film having a width of not smaller than 20 mm, wherein: in a case where roughness along a width direction of an outermost surface of the roll is measured at 1 mm intervals across an entire width of the outermost surface, a difference between a maximum roughness value and a minimum roughness value for a distance of 20 mm in the width direction of the outermost surface is less than 25 μm.

The roll of an embodiment of the present invention is preferably such that a difference between a maximum film-thickness value and a minimum film-thickness value for a distance of 20 mm in an width direction of an outermost porous film of the roll is not more than 1.6 μm.

The roll of an embodiment of the present invention is preferably such that the porous film includes a polyolefin-containing layer.

The roll of an embodiment of the present invention is preferably such that the porous film includes a polyolefin-containing layer and a coating layer that is formed by coating the polyolefin-containing layer.

The roll of an embodiment of the present invention is preferably such that the coating is performed with use of a coating device that includes an unwrinkling mechanism.

The roll of an embodiment of the present invention is preferably such that the unwrinkling mechanism is a pinch expander.

The roll of an embodiment of the present invention is preferably such that the coating layer is formed by drying after the coating; and the drying is performed with use of a dryer that includes an unwrinkling mechanism.

The roll of an embodiment of the present invention is preferably such that the dryer is a drum dryer.

The roll of an embodiment of the present invention is preferably such that the porous film includes a polyolefin-containing layer and at least one layer selected from the group consisting of a heat-resistant-resin-containing layer and an adhesive-resin-containing layer.

The roll of an embodiment of the present invention is preferably such that the porous film includes a polyolefin-containing layer and a heat-resistant-resin-containing layer.

A method for producing the roll of an embodiment of the present invention includes the method comprising the step of: applying, to the polyolefin-containing layer, a coating solution for formation of the coating layer.

Advantageous Effects of Invention

The present invention makes it possible to provide a separator that can provide a battery which is highly safe even in a case where an internal short circuit has occurred.

BRIEF DESCRIPTION OF DRAWINGS (a) and (b) of FIG. 1 illustrate an example of a roll of an embodiment of the present invention.

Figure 5:
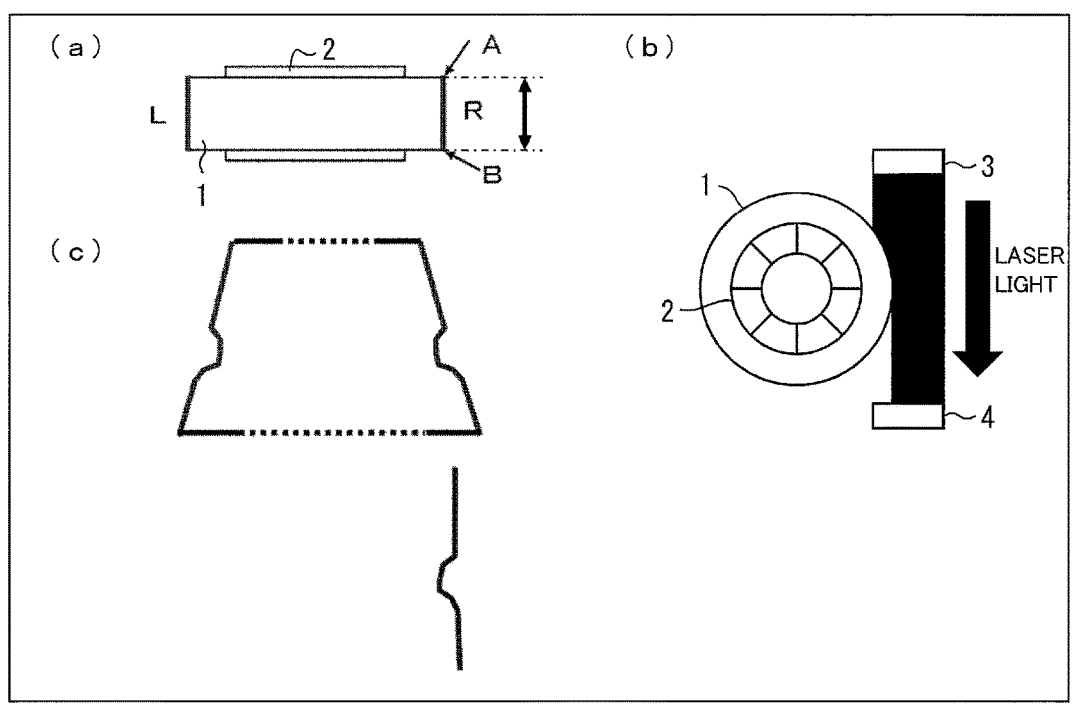

(a) through (c) of FIG. 5 illustrate a method for measuring roughness of an outermost surface of a roll of an Example of the present invention.

Figure 6:
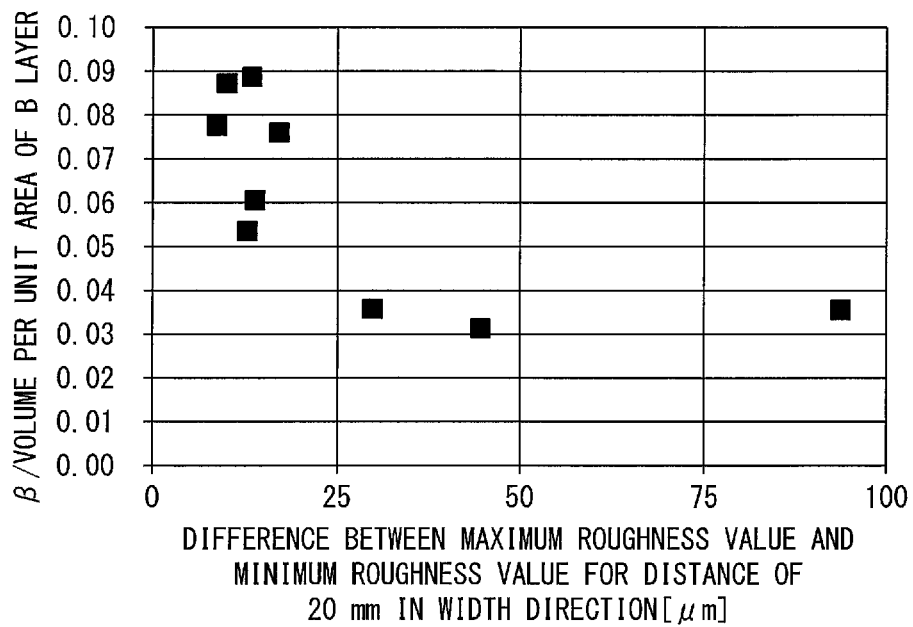

FIG. 6 is a graph showing (i) a difference between a maximum roughness value and a minimum roughness value, which are obtained through roughness measurement, for a distance of 20 mm in a width direction, and (ii) a 50% breakdown voltage calculated through a nail penetration test, of each of lithium-ion secondary batteries obtained in Examples and Comparative Examples.

Figure 7:
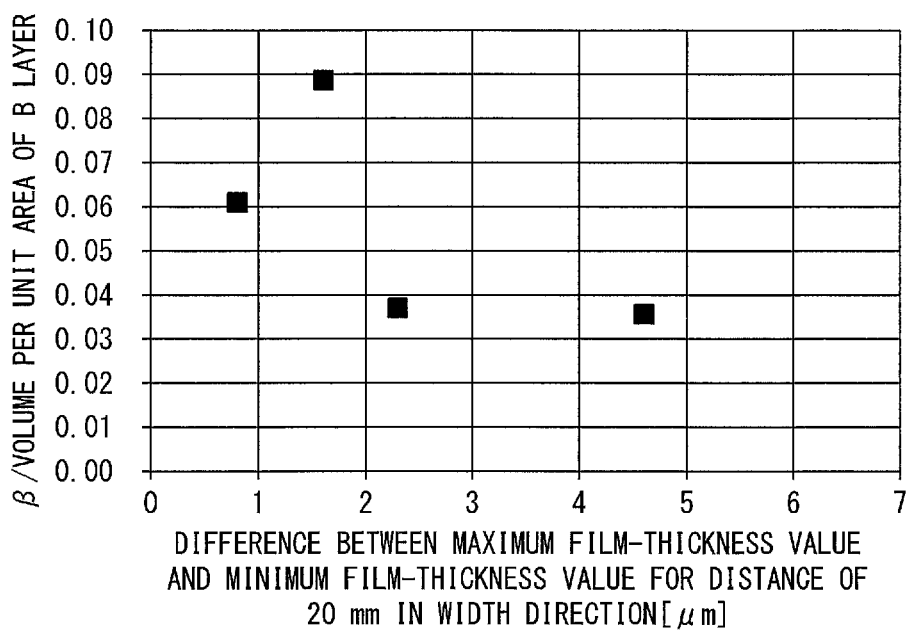

FIG. 7 is a graph showing (i) a difference between a maximum film-thickness value and a minimum film-thickness value, which are obtained through film-thickness measurement under a cross-sectional SEM, for a distance of 20 mm in a width direction, and (ii) a 50% breakdown voltage calculated through a nail penetration test, of each of the lithium-ion secondary batteries obtained in Examples and Comparative Examples.

DESCRIPTION OF EMBODIMENTS

The description below deals with an embodiment of the present invention. The present invention is, however, not limited to such an embodiment. Further, the present invention is not limited to a description of configurations below, but may be altered in various ways by a skilled person within the scope of the claims. Any embodiment or example based on a proper combination of technical means disclosed in different embodiments and examples is also encompassed in the technical scope of the present invention. All academic and patent literatures cited in the present specification are incorporated herein by reference. In the present specification, any numerical range expressed as "A to B" means "not less than A and not greater than B", unless otherwise stated.

[1-1. Basic Configuration of Roll]

A roll of the present embodiment is a roll that is made of a porous film in a belt-like shape, the porous film having a width of not smaller than 20 mm, wherein: in a case where roughness along a width direction of an outermost surface of the roll is measured at 1 mm intervals across an entire width of the outermost surface, a difference between a maximum roughness value and a minimum roughness value for a distance of 20 mm in the width direction of the outermost surface is less than 25 μm.

The "roll" as used in the present specification means a roll that is produced by winding a porous film with use of, for example, a commercially available winder.

The roll is not particularly limited in shape. The roll can have a cylindrical shape whose circular top and/or circular bottom have a diameter of approximately 10 mm to 1,000 mm, approximately 25 mm to 750 mm, or approximately 50 mm to 500 mm.

The roll can be provided, at a center thereof, with a space in which the porous film is absent, but such a space can be omitted. The space, in which the porous film is absent, can have a cylindrical shape. More specifically, such a space can have a cylindrical shape whose circular top and/or circular bottom have a diameter of approximately 10 mm to 300 mm, approximately 25 mm to 250 mm, or approximately 50 mm to 230 mm.

The roll can be produced by winding the porous film once or a plurality of times. In a case where the porous film is wound a plurality of times, it can be wound twice to 100,000 times, twice to 7,000 times, or 1,000 times to 7,000 times. Of course, the roll can alternatively be produced by winding the porous film more than 100,000 times.

The porous film of an embodiment of the present invention is typically composed of at least one layer (e.g., at least an A layer), and is preferably composed of two or more layers (e.g., at least an A layer and a B layer). Specific configurations of the A layer and the B layer will be described later.

The porous film is in a belt-like shape and has a width of not smaller than 20 mm. The width of the porous film only needs to be not smaller than 20 mm. For example, the width of the porous film can be not smaller than 30 mm, not smaller than 40 mm, not smaller than 50 mm, not smaller than 60 mm, not smaller than 70 mm, not smaller than 80 mm, not smaller than 90 mm, or not smaller than 100 mm. An upper limit of the width of the porous film is not particularly limited. The upper limit can be 1,000 mm or 100 mm. Of course, the present invention is not limited to such a configuration.

The roll of the present embodiment is such that, in a case where roughness along a width direction of an outermost surface of the roll is measured at 1 mm intervals across an entire width of the outermost surface, a difference between a maximum roughness value and a minimum roughness value for a distance of 20 mm in the width direction of the outermost surface is less than 25 µm. The following will discuss this point with reference to (a) and (b) of FIG. 1.

Figure 1:
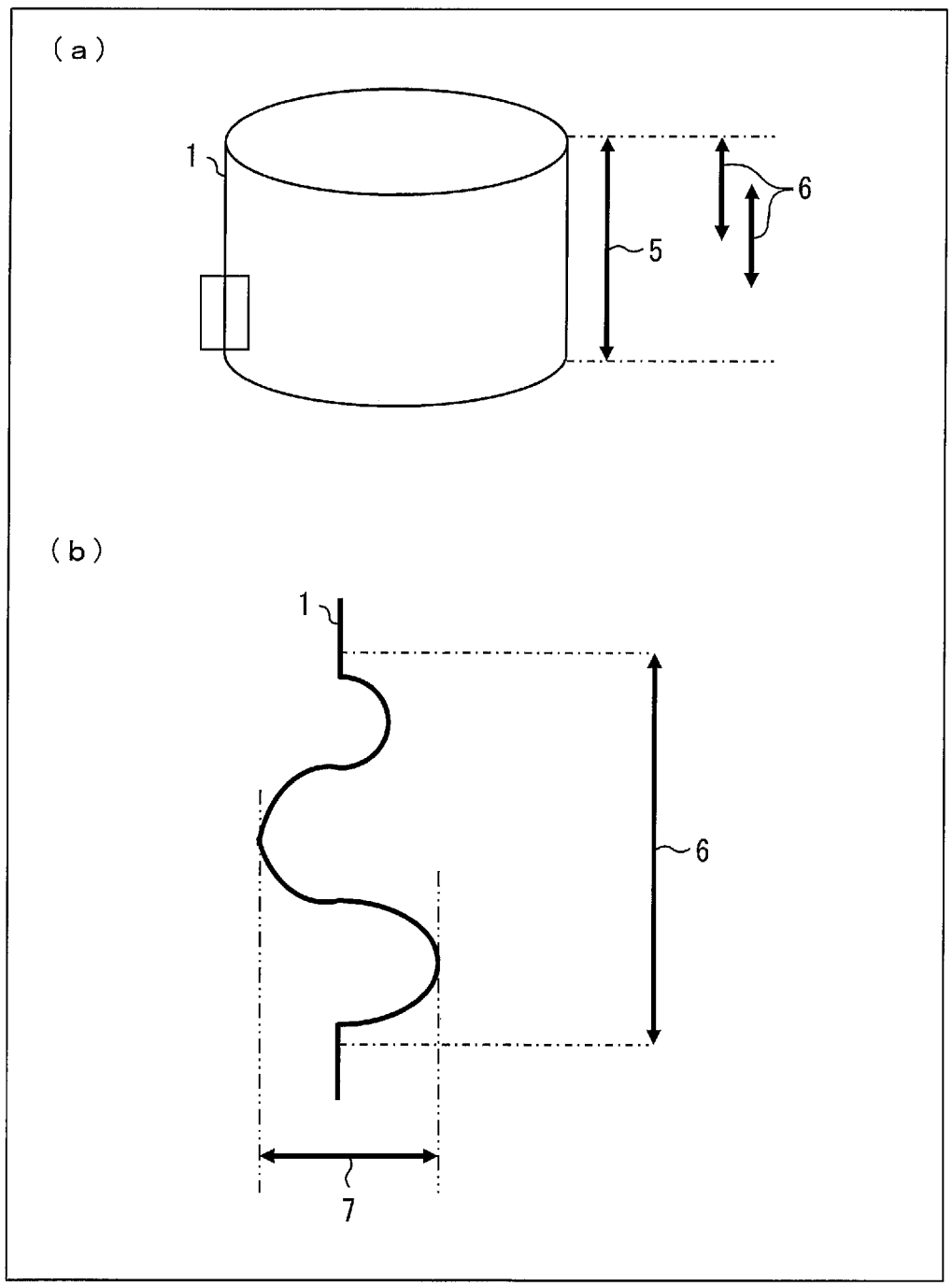

The roll 1 illustrated in (a) of FIG. 1 has the entire width indicated by an arrow 5. Arrows 6 each indicate a portion of 20 mm in the width direction (20-mm-widthwise portion). Note that in a case where the entire width is 20 mm, there is a single "20-mm-widthwise portion". Meanwhile, in a case where the entire width is larger than 20 mm, there is a plurality of "20-mm-widthwise portions".

(b) of FIG. 1 is an enlarged view of a part of the outermost surface of the roll, which part is enclosed by a rectangle in (a) of FIG. 1. As illustrated in (b) of FIG. 1, the outermost surface of the roll has many projections and depressions (roughness). An arrow 7 illustrated in (b) of FIG. 1 indicates the difference between the maximum roughness value and the minimum roughness value in the 20-mm-widthwise portion (i.e., in the portion indicated by the arrow 6).

The roll of the present embodiment is such that, in a case where the roughness along the width direction of the outermost surface of the roll is measured at 1 mm intervals across the entire width of the outermost surface, the difference between the maximum roughness value and the minimum roughness value is as follows in at least one of a plurality of "20-mm-widthwise portions" or in all of the plurality of "20-mm-widthwise portions": less than 25 µm, preferably less than 24 µm, preferably less than 23 µm, preferably less than 22 µm, preferably less than 21 µm, preferably less than 20 µm, preferably less than 19 µm, preferably less than 18 µm, preferably less than 17 µm, preferably less than 16 µm, preferably less than 15 µm, preferably less than 14 µm, preferably less than 12 µm, preferably less than 11 µm, preferably less than 10 µm, preferably less than 9 µm, preferably less than 8 µm, preferably less than 7 µm, preferably less than 6 µm, preferably less than 5 µm, preferably less than 4 µm, preferably less than 3 µm, and even more preferably less than 1 µm. Note that a lower limit of the difference between the maximum roughness value and the minimum roughness value for the distance of 20 mm in the width direction is not particularly limited, and the lower limit is, however, preferably not less than 0.5 µm (e.g., 0.5 µm).

Further, the roll of the present embodiment is such that, in a case where the roughness along the width direction of the outermost surface of the roll is measured at 1 mm intervals across the entire width of the outermost surface, the difference between the maximum roughness value and the minimum roughness value is as follows in at least one of a plurality of "5-mm-widthwise portions" or in all of the plurality of "5-mm-widthwise portions": less than 20 µm, preferably less than 19 µm, preferably less than 18 µm, preferably less than 17 µm, preferably less than 16 µm, preferably less than 15 µm, preferably less than 14 µm, preferably less than 13 µm, preferably less than 12 µm, preferably less than 11 µm, preferably less than 10 µm, preferably less than 9 µm, preferably less than 8 µm, preferably less than 7 µm, preferably less than 6 µm, preferably less than 5 µm, preferably less than 4 µm, preferably less than 3 µm, and even more preferably less than 1 µm. Note that a lower limit of the difference between the maximum roughness value and the minimum roughness value in the 5-mm widthwise portion is not particularly limited. The lower limit is, however, preferably not less than 0.5 µm (e.g., 0.5 µm). Note also that the roughness can be measured by any method, and can be measured by a method that will be described later in Examples.

With the above configuration, it is possible to provide a battery that is highly safe even in a case where an internal short circuit has occurred.

In a case where the difference between the maximum roughness value and the minimum roughness value falls within the above ranges in at least one of the plurality of "20-mm-widthwise portions" or in at least one of the plurality of "5-mm-widthwise portions", it is preferable that this "20-mm-widthwise portion" or this "5-mm-widthwise portion" include a center point of the entire width of the roll, and it is even more preferable that a widthwise center point of the "20-mm-widthwise portion" or a widthwise center point of the "5-mm-widthwise portion" coincide with the center point of the entire width of the roll.

The roll of the present embodiment is such that, in a case where a film thickness of an outermost porous film is measured within ±10 mm in a width direction from a widthwise center point of the outermost porous film, a difference between a maximum film-thickness value and a minimum film-thickness value for a distance of 20 mm in the width direction of the outermost porous film is not more than 1.6 µm, preferably less than 1.5 µm, preferably less than 1.4 µm, preferably less than 1.3 µm, preferably less than 1.2 µm, preferably less than 1.1 µm, preferably less than 1.0 µm, preferably less than 0.9 µm, preferably less than 0.8 µm, preferably less than 0.7 µm, preferably less than 0.6 µm, preferably less than 0.5 µm, preferably less than 0.4 µm, preferably less than 0.3 µm, and preferably less than 0.2 µm. Note that a lower limit of the difference between the maximum film-thickness value and the minimum film-thickness value for the distance of 20 mm in the width direction is not particularly limited. The lower limit is, however, preferably not less than 0.05 µm (e.g., 0.05 µm), and more preferably not less than 0.1 µm (e.g., 0.1 µm). Note also that the difference between the maximum film-thickness value and the minimum film-thickness value can be calculated by any method, and can be calculated by (i) measuring a film thickness by a method that will be described later in Examples and (ii) subtracting a measured minimum film-thickness value from a measured maximum film-thickness value.

With the above configuration, it is possible to provide a battery that is highly safe even in a case where an internal short circuit has occurred.

As described above, each of (i) the lower limit of the difference between the maximum roughness value and the minimum roughness value for the distance of 20 mm in the width direction and (ii) the lower limit of the difference between the maximum roughness value and the minimum roughness value for the distance of 5 mm in the width direction is preferably not less than 0.5 μm (e.g., 0.5 μm). Further, the lower limit of the difference between the maximum film-thickness value and the minimum film-thickness value for the distance of 20 mm in the width direction is preferably not less than 0.05 μm, and more preferably not less than 0.1 μm. In a case where the roughness is too small, a higher tensile force may be required to wind off the separator during production of the battery. This tensile force may stretch the separator beyond a proper limit, and may ultimately cause a decrease in safety of the battery. Further, in a case where the roughness is too small, a charge of the separator may become higher when the separator is wound off. This may disadvantageously affect transfer of the separator.

Meanwhile, in a case where the roll made of a porous film has large projections and depressions within a small surface area, the porous film may be locally stretched in a case where an internal short circuit has been caused by, for example, penetration of a metal into the battery. This causes a decrease in strength of the porous film, and may ultimately cause a decrease in safety of the battery.

The following will further discuss the A layer and the B layer that constitute the porous film.

[1-2. A Layer]

The A layer can be configured to melt and thereby make the porous film (in other words, separator) non-porous in a case where the battery has generated heat. Thus, the A layer can impart a shutdown function to the porous film.

The porous film can include a single A layer or a plurality of A layers.

A specific configuration of the A layer is not particularly limited. The A layer is preferably, for example, a polyolefin-containing layer.

Examples of polyolefin include high molecular weight homopolymers or copolymers produced through polymerization of ethylene, propylene, 1-butene, 4-methyl-1-pentene, 1-hexene, and/or the like. The A layer can be a layer containing only one of these polyolefins and/or a layer containing two or more of these polyolefins.

Among the above polyolefins, a high molecular weight polyethylene that contains ethylene as a main component is preferable, because such a polyethylene has a shutdown temperature preferable for typical lithium secondary batteries.

A proportion of a polyolefin component relative to the A layer is not particularly limited. The proportion of the polyolefin component relative to the A layer, however, is preferably not less than 50 vol %, more preferably not less than 60 vol %, more preferably not less than 70 vol %, more preferably not less than 80 vol %, more preferably not less than 90 vol %, more preferably not less than 95 vol %, and most preferably 100 vol %.

The A layer can also contain another component(s) that is not a polyolefin, as long as the another component(s) does not impair a function of the A layer.

In a case where the roll of the present embodiment is used as a separator for a nonaqueous electrolyte secondary battery, it is preferable, from the viewpoint of preventing dissolution of a component of the separator in an electrolyte, that a layer (e.g., A layer and/or B layer) of the porous film contain a polymer having a weight-average molecular weight of $1 \times 10^5$ to $15 \times 10^6$, more preferably of $3 \times 10^5$ to $10 \times 10^6$, and most preferably of $5 \times 10^5$ to $5 \times 10^6$. For this reason, it is preferable that a weight-average molecular weight of the above polyolefin fall within the above ranges.

A thickness of the A layer can be, for example, 4 μm to 50 μm, and is preferably 5 μm to 30 μm. In a case where the thickness of the A layer is smaller than 4 μm, the porous film may have insufficient strength. Meanwhile, in a case where the thickness of the A layer exceeds 50 μm, the battery may have a lower capacity due to the excessively large thickness of the porous film.

A porosity of the A layer can be, for example, 20 vol % to 80 vol %, and is preferably 30 vol % to 70 vol %. In a case where the porosity of the A layer is less than 20 vol %, the porous film may retain a smaller amount of an electrolyte. Meanwhile, in a case where the porosity of the A layer exceeds 80 vol %, the porous film may have an insufficient shutdown function. It follows that in a case where the battery severely generates heat, the A layer that has been melted may not be able to completely clog large interstices, and as a result, the A layer may not be able to block a current.

In a case where the porous film is used as a separator for a nonaqueous electrolyte secondary battery, a pore size of the A layer is preferably not larger than 3 μm, and even more preferably not larger than 1 μm from the viewpoint of achieving an excellent ion permeability and preventing particles from entering an anode and/or a cathode.

The A layer has a structure that includes communicating pores and that can transmit gases and/or liquids from one side to the other side. Permeabilities to such gases and/or liquids can be expressed in an air permeability. The air permeability of the A layer can be 30 sec/100 cc to 1,000 sec/100 cc, and is preferably 50 sec/100 cc to 800 sec/100 cc.

A weight per unit area related to heat-resistance (hereinafter referred to as a "weight per unit area") of the A layer can be 2 $g/m^2$ to 15 $g/m^2$, and is preferably 4 $g/m^2$ to 12 $g/m^2$. In a case where the weight per unit area of the A layer is less than 2 $g/m^2$, the porous film may have insufficient strength. Meanwhile, in a case where the weight per unit area of the A layer exceeds 15 $g/m^2$, the battery may have a lower capacity due to the excessively large thickness of the porous film.

Examples of a method for producing the A layer include a method in which, as disclosed in (1) Japanese Patent Application Publication, Tokukaihei, No. 7-29563 (1995), a film is formed by adding a plasticizing agent into a thermoplastic resin and then the plasticizing agent is removed with use of a proper solvent.

The A layer is generally produced while being conveyed by a conveyer that includes an unwrinkling mechanism. Examples of the unwrinkling mechanism include a bent roller (e.g., bow-like roller, banana-shaped roller, curved roller), a flat expander roller, a helical roller, and a pinch expander.

For example, in a case where an A layer is to be formed of a polyolefin resin that contains (i) a high molecular weight polyethylene having a weight-average molecular weight of more than 1,000,000 and (ii) a low molecular weight polyolefin having a weight-average molecular weight of not more than 10,000, it is preferable, in view of production cost, to form the A layer by a method including the steps of:

(a) kneading (i) 100 parts by weight of the high molecular weight polyethylene, (ii) 5 parts by weight to 200 parts by weight of the low molecular weight polyolefin, and (iii) 100 parts by weight to 400 parts by weight of an inorganic filler such as calcium carbonate so as to produce a polyolefin resin composition;

(b) shaping the polyolefin resin composition into a sheet;

(c) removing the inorganic filler from the sheet produced in the step (b); and (d) stretching the sheet produced in the step (c) so as to obtain the A layer.

[1-3. B Layer]

The B layer is different from the A layer, and is preferably a layer that includes a function different from the shutdown function.

The B layer can be, for example, a layer that contains a heat-resistant material and exhibits heat resistance to high temperatures at which shutdown may occur. The B layer can also be a porous layer. Further, the B layer can also be an adhesive layer that bonds the A layer to another component (e.g., another B layer or electrode).

In a case where the B layer is a layer that contains a heat-resistant material, a porous film that includes this B layer can maintain shape stability even at high temperatures. Specifically, in a case where the B layer is a porous layer that contains a heat-resistant material, the porous film can maintain shape stability even at such a high temperature that has risen, beyond the shutdown temperature of the A layer, to a temperature at which the A layer starts shrinking.

Note that the B layer is preferably a layer that can be obtained by applying, to the A layer, a coating solution that contains a material for formation of the B layer.

Note that the "heat-resistant material" as used in the present specification is defined to mean a material that does not melt or thermally decompose at temperatures at which the A layer melts (for example, at approximately 130° C. in a case where the A layer is made of polyethylene).

The porous film can include a single B layer or a plurality of B layers. For example, two or more B layers can be provided so as to sandwich the A layer. In a case where the porous film includes a plurality of B layers, (i) the B layers can contain identical or different heat-resistant materials, respectively, (ii) the B layers can be identical or different adhesive layers, respectively, or (iii) the B layers can include both of a heat-resistant-material-containing layer (i.e., a heat-resistant layer) and an adhesive layer.

A proportion of a heat-resistant material in a single B layer can be more than 50 vol % relative to an entire volume of the single B layer. The proportion of the heat-resistant material, however, is preferably not less than 60 vol %, more preferably not less than 70 vol %, more preferably not less than 80 vol %, more preferably not less than 90 vol %, and even more preferably not less than 95 vol %.

Examples of the heat-resistant material include a heat-resistant resin and a heat-resistant resin composition that contains the heat-resistant resin and a filler.

Examples of the heat-resistant resin include polyamide, polyimide, polyamide imide, polycarbonate, polyacetal, polysulfone, polyphenylene sulfide, polyether ether ketone, aromatic polyester, polyether sulfone, polyetherimide, and cellulose ethers. These heat-resistant resins can be used alone or in combination of two or more kinds.

Among the above heat-resistant resins, from the viewpoint of a further increase in heat resistance, (i) polyamide, polyimide, polyamide imide, polyether sulfone, and polyetherimide are preferable, (ii) polyamide, polyimide, and polyamide imide are more preferable, (iii) nitrogen-containing aromatic polymers such as aromatic polyamide (para-oriented aromatic polyamide, meta-oriented aromatic polyamide), aromatic polyimide, and aromatic polyamide imide are even more preferable, and (iv) aromatic polyamide is further preferable. From the viewpoint of heat resistance, para-oriented aromatic polyamide (hereinafter referred to also as "para-aramid") is particularly preferable.

Para-aramid can be synthesized through condensation polymerization of para-oriented aromatic diamine and para-oriented aromatic dicarboxylic acid halide, and substantially includes repeating units in which amide bonds are bonded at para positions or corresponding orientation positions (for example, orientation positions that extend coaxially or parallel in opposite directions such as the cases of 4,4'-biphenylene, 1,5-naphthalene, and 2,6-naphthalene) of aromatic rings. Examples of the para-aramid include para-aramids each having a para-oriented structure or a structure corresponding to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloroparaphenylene terephthalamide), and a paraphenylene terephthalamide/2,6-dichloroparaphenylene terephthalamide copolymer.

The aromatic polyimide is preferably fully aromatic polyimide produced through condensation polymerization of an aromatic diacid anhydride and a diamine. Examples of the diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

The aromatic polyamide imide is, for example, produced through (i) condensation polymerization of aromatic dicarboxylic acid and aromatic diisocyanate or (ii) condensation polymerization of aromatic diacid anhydride and aromatic diisocyanate. Examples of the aromatic dicarboxylic acid include isophthalic acid and terephthalic acid. Examples of the aromatic diacid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylene diisocyanate, and m-xylene diisocyanate.

Examples of the cellulose ether include carboxymethyl cellulose (CMC), hydroxyethyl cellulose (HEC), carboxy ethyl cellulose, methyl cellulose, ethyl cellulose, cyanethyl cellulose, and oxyethyl cellulose. Among these, CMC and HEC, each of which has excellent chemical and thermal stability, are preferable, and CMC is more preferable.

The filler can be an organic filler or an inorganic filler (e.g., ceramic).

Examples of the organic filler include fine particles made of: (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; a fluorine-based resin such as polytetrafluoroethylene, a tetrafluoroethylene-hexafluoropropylene copolymer, a tetrafluoroethylene-ethylene copolymer, or polyvinylidene fluoride (polyvinylidene fluoride-based resin); melamine resin; urea resin; polyethylene; polypropylene; or polymethacrylate.

Examples of the inorganic filler include fine particles made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, or glass.

Alternatively, it is possible to use a material, such as a hydrate of the filler, which is similar to the filler. Such fillers can be used alone or in combination of two more kinds.

Among these fillers, from the viewpoint of a further increase in chemical stability and shape stability at high temperatures, a filler made of an inorganic oxide is preferable, and a filler made of α-alumina is more preferable.

Note that the filler is preferably a filler capable of forming a sufficient amount of pores in the B layer to ensure ion permeability of the B layer.

Relative to total 100 wt % of the heat-resistant resin and the filler, a weight proportion of the filler can be 20 wt % to 99 wt %. The weight proportion is, however, preferably 30 wt % to 99 wt %, more preferably 40 wt % to 99 wt %, more preferably 50 wt % to 99 wt %, and even more preferably 60 wt % to 99 wt %. In a case where the weight proportion of the filler falls within such a certain range, it is possible to obtain a porous film having an excellent balance between ion permeability and improbability of powder falling. Note that powder falling is a phenomenon in which a filler is peeled off of a porous film.

Examples of an adhesive material include an adhesive resin and an adhesive resin composition that contains a filler. In a case where the B layer is an adhesive layer made of an adhesive material, the B layer can bond the A layer to another member (e.g., another B layer or electrode). Examples of the adhesive resin include fluoride-based resins such as a polyvinylidene fluoride-based resin.

Examples of the polyvinylidene fluoride-based resin include (i) a homopolymer of vinylidene fluoride (i.e., polyvinylidene fluoride), (ii) a copolymer of vinylidene fluoride and another monomer(s) that can be copolymerized with the vinylidene fluoride, and (iii) a mixture of such homopolymer and such a copolymer. Further, the polyvinylidene fluoride-based resin can be used in combination with another polymer(s) (e.g., acrylic-based polymers).

Example of the monomer that can be copolymerized with vinylidene fluoride include tetrafluoroethylene, hexafluoropropylene, trifluoroethylene, trichloroethylene, vinyl fluoride, (meth)acrylic acid, (meth)acrylic acid ester (e.g., methyl (meth)acrylate, ethyl (meth)acrylate), vinyl acetate, vinyl chloride, and acrylonitrile. These monomers can be used alone or in combination of two or more kinds. The polyvinylidene fluoride-based resin can be synthesized through emulsion polymerization or suspension polymerization. Note that a terminal structure of the polyvinylidene fluoride-based resin and a catalyst for use in such polymerization can be arbitrarily selected.

For example, the polyvinylidene fluoride-based resin can be (i) a polyvinylidene fluoride-based resin A, (ii) a polyvinylidene fluoride-based resin B, or (iii) a mixture of the polyvinylidene fluoride-based resin A and the polyvinylidene fluoride-based resin B. The polyvinylidene fluoride-based resin A can be a polyvinylidene fluoride-based resin that contains a constituent unit derived from vinylidene fluoride and a constituent unit derived from hexafluoropropylene, where a proportion of the constituent unit derived from hexafluoropropylene, relative to all constituent units of the polyvinylidene fluoride-based resin A, is not less than 0.5 mol % and not more than 1.5 mol % (more preferably, not less than 1.0 mol % and not more than 1.4 mol %). The polyvinylidene fluoride-based resin B can be a polyvinylidene fluoride-based resin that contains a constituent unit derived from vinylidene fluoride and a constituent unit derived from hexafluoropropylene, where a proportion of the constituent unit derived from hexafluoropropylene, relative to all constituent units of the polyvinylidene fluoride-based resin B, is more than 1.5 mol % (more preferably, not less than 1.8 mol %). Further, the polyvinylidene fluoride-based resin B is preferably such that the proportion of the constituent unit derived from hexafluoropropylene, relative to all the constituent units of the polyvinylidene fluoride-based resin B, is less than 25 mol %. With the above configuration, it is also possible to improve adhesiveness of the B layer.

Example of the acrylic-based polymer include polyacrylic acid, polyacrylate, crosslinked polyacrylic acid, crosslinked polyacrylic acid ester, polymethacrylic acid ester, crosslinked polymethacrylic acid, and crosslinked polymethacrylic acid ester.

In particular, the polyvinylidene fluoride-based resin is preferably polyvinylidene fluoride, a copolymer of vinylidene fluoride and tetrafluoroethylene, a copolymer of vinylidene fluoride and hexafluoropropylene, a copolymer of vinylidene fluoride and trifluoroethylene, a mixture of polyvinylidene fluoride and an acrylic-based polymer, or a mixture of a polyvinylidene fluoride copolymer and an acrylic-based polymer.

The polyvinylidene fluoride-based resin contains, as a constituent unit, vinylidene fluoride at not less than 50 mol %, more preferably not less than 60 mol %, more preferably not less than 70 mol %, more preferably not less than 80 mol %, more preferably not less than 90 mol %, more preferably not less than 95 mol %, and even more preferably not less than 98 mol %. The above configuration makes it possible to ensure a sufficient mechanical property and a sufficient heat resistance of the B layer even under a severe heat press condition (e.g., even in a case where a separator sandwiched between electrodes is subjected to pressure bonding or heat press).

The polyvinylidene fluoride-based resin has a weight-average molecular weight (Mw) that falls within a range of preferably 1,000 to 5,000,000, more preferably 10,000 to 5,000,000, more preferably 300,000 to 3,000,000, more preferably 300,000 to 2,000,000, and even more preferably 500,000 to 1,500,000. The above configuration makes it possible to ensure a sufficient mechanical property and a sufficient easy-shaping processability of the B-layer.

Note that the weight-average molecular weight of the polyvinylidene fluoride-based resin can be obtained through a gel permeation chromatography (GPC). For example, the weight-average molecular weight of the polyvinylidene fluoride-based resin can be calculated in terms of polystyrene after measurement under the following conditions:

GPC: Gel Permeation Chromatograph Alliance GPC2000 System (manufactured by Waters Corp.)
    Column: TSKgel GMH6-HT×2+TSKgel GMH6-HT×2 (manufactured by Tosoh Corp.)
    Mobile phase solvent: o-dichlorobenzene
    Standard specimen: Monodisperse polystyrene (manufactured by Tosoh Corp.)
    Column temperature: 140° C.

It is known that in a nonaqueous secondary battery, cathode oxidation resistance generally influences durability of the battery. Since the polyvinylidene fluoride-based resin has a high oxygen index and a high oxidation resistance, it is possible to increase durability of a nonaqueous secondary battery by using the polyvinylidene fluoride-based resin for a separator. Oxidation resistance of a separator can be checked by (i) disassembling a battery that has been repeatedly charged and discharged and then (ii) observing a surface of the separator. Typically, a separator that has a low oxidation resistance turns black or brown, whereas a separator that has a high oxidation resistance does not discolor.

The adhesive layer can contain a filler unless the filler impairs the function of the adhesive layer. Examples of the filler include the above described fillers for a heat-resistant composition. Among such fillers, from the viewpoint of a further increase in shape stability at high temperatures, a filler made of an inorganic oxide is preferable, and a filler made of α-alumina is more preferable.

The B layer can contain another component(s) such as, for example, a dispersing agent, a plasticizing agent, and a pH adjusting agent, unless the another component(s) impairs the function of the B layer.

A thickness of the B layer can be 1 µm to not larger than 25 µm, but is preferably in a range of 5 µm to not larger than 20 µm. If the thickness of the B layer is smaller than 1 µm, the B layer may shrink in a case where the B layer cannot resist thermal shrinkage of the A layer due to heat generated in the battery by an accident or the like. In such a case, the separator may accordingly shrink. Meanwhile, if the thickness of the B layer exceeds 25 µm, the porous film may become so thick as to cause the battery to have a lower capacity. Note that in a case where a plurality of B layers are provided (e.g., in a case where the B layer is provided on both sides of the A layer), the "thickness of the B layer" means a total thickness of the plurality of B layers.

A configuration and the number of other layers of the porous film than the A layer and the B layer are not particularly limited, and any desired layers can be used as the other layers. For example, it is possible to use an oxidation-resistant layer, a layer that performs shutdown at a temperature lower than the shutdown temperature of the A layer, and/or a low-friction layer. Note that respective functions of such desired layers can also be imparted to the A layer and/or the B layer.

[1-4. Preparation of B Layer, Porous Film, and Roll]

The B layer can be formed on the A layer (e.g., on one side of the A layer) by, for example, a method in which the A layer and the B layer are separately produced and are then laminated on top of each other or a method in which the B layer is formed as a coating layer by applying, to the A layer (e.g., to one side of the A layer), a coating solution that contains a material for formation of the B layer. In view of simplicity, the latter method is preferable.

Assume a case where in the latter method in which the B layer is formed as a coating layer by applying, to the A layer, a coating solution that contains a material for formation of the B layer, the coating solution contains a heat-resistant material, which is a heat-resistant resin, as the material for formation of the B layer. In such a case, it is possible to use, for example, a method (hereinafter, may be referred to as "Method 1") including the following steps of:

(A) preparing (i) a polar organic solvent solution in which the heat-resistant resin is dissolved in a polar organic solvent or (ii) a slurry in which a filler is dispersed in the polar organic solvent solution in which the heat-resistant resin is dissolved;

(B) forming a coating film (coating layer) by applying the polar organic solvent solution or the slurry to the A layer; and (C) drying after depositing the heat-resistant resin from the coating film through, for example, humidification of the coating film, solvent elimination of the coating film, or immersion of the coating film in a solvent that does not dissolve the heat-resistant resin.

In a case where the heat-resistant resin is an aromatic polyamide in the polar organic solvent solution, the polar organic solvent can be a polar amide-based solvent or a polar urea-based solvent. Examples of such a polar organic solvent include N,N-dimethylformamide, N,N-dimethylacetamide, N-methyl-2-pyrrolidone (NMP), or tetramethylurea.

In a case where the heat-resistant resin is a para-aramid, it is preferable to add, for the purpose of increasing solubility of the para-aramid to a solvent, a chloride of alkali metal or of alkali earth metal during polymerization of the para-aramid.

Specific examples of the chloride include lithium chloride and calcium chloride, but the chloride is not limited to these examples. The chloride is added to a polymerization system in an amount in a range of preferably 0.5 mol to 6.0 mol, and even more preferably 1.0 mol to 4.0 mol, per 1.0 mol of an amide group synthesized through condensation polymerization. In a case where the amount of the chloride is less than 0.5 mol, a resultant para-aramid may have insufficient solubility. Meanwhile, in a case where the amount of the chloride is more than 6.0 mol, the amount of the chloride substantially exceed a solubility of the chloride to a solvent. Accordingly, it is not preferable to add the chloride in an amount in a range of less than 0.5 mol and more than 6.0 mol. Generally, in a case where the amount of the chloride of alkali metal or of alkali earth metal is less than 2 wt %, the para-aramid may have insufficient solubility. Meanwhile, in a case where the amount of the chloride of alkali metal or of alkali earth metal exceeds 10 wt %, the chloride may not dissolve in a polar organic solvent such as a polar amide-based solvent or a polar urea-based solvent.

In a case where the heat-resistant resin is an aromatic polyimide, suitable examples of a polar organic solvent to dissolve the aromatic polyimide include dimethyl sulfoxide, cresol, and o-chlorophenol in addition to those discussed as examples of the solvent to dissolve an aramid.

Drying is typically used for removing a medium which is contained in (i) the polar organic solvent solution or (ii) the slurry, which has been applied to the A layer. For example, the medium can be removed by drying after the steps of (a) preparing a solvent that dissolves the medium but not a resin in use, and (b) depositing the resin, by immersing (i) the polar organic solvent solution or (ii) the slurry in the solvent and thereby substituting the medium by the solvent. Note that in a case where the polar organic solvent solution or a slurry liquid is applied to the A layer, the medium or the solvent is dried preferably at a temperature that does not change the air permeability of the A layer.

Note that it is possible to add, to the polar organic solvent solution or the slurry liquid, at least one additive selected from, for example, the group consisting of a surfactant, a pH adjusting agent, a dispersing agent, and a plasticizing agent, unless such an additive impairs the object of the present invention.

Assume a case where in the method in which the B layer is formed as a coating layer by applying, to the A layer, a coating solution that contains a material for formation of the B layer, the coating solution contains a heat-resistant material as the material for formation of the B layer, which heat-resistant material is a heat-resistant-resin composition that contains not less than 80 wt % of a filler relative to total 100 wt % of a heat-resistant resin and the filler. In such a case, it is possible to use, for example, a method (hereinafter, may be referred to as "Method 2") including the following steps of:

(D) preparing a slurry containing a heat-resistant resin, a filler, and a medium;

(E) forming a coating film (coating layer) by applying the slurry to the A layer; and (F) removing the medium.

The medium (solvent or dispersion medium) simply needs to be capable of dissolving or dispersing components of the heat-resistant material uniformly and stably. Specific examples of the medium include water, alcohols such as methanol, ethanol, and isopropanol, acetone, toluene, xylene, hexane, N-methylpyrrolidone, N,N-dimethylacetamide, and N,N-dimethylformamide. These mediums can be used alone, or in combination of two or more kinds as long as mediums to be used in combination are compatible with each other. In view of process and environmental load, preferably, not less than 80 wt % of the medium is composed of water, and more preferably, the medium is composed of only water.

In a case where the medium contains water, it is preferable to perform a hydrophilization treatment on the A layer before applying the slurry to the A layer. Performing the hydrophilization treatment on the A layer further improves application processability, and allows formation of a more homogeneous B layer. The hydrophilization treatment is effective particularly in a case where the medium has a high water concentration.

The hydrophilization treatment on the A layer can be performed by any method, and specific examples of the hydrophilization treatment include (i) a chemical treatment involving an acid, an alkali, or the like, (ii) a corona treatment, and (iii) a plasma treatment.

Among the above hydrophilization treatments, the corona treatment is preferable because it can not only hydrophilize the A layer within a relatively short time period, but also reform the polyolefin through corona discharge only at a surface and its vicinity of the A layer and leave an inside of the A layer unchanged in property while ensuring high application processability.

Drying is typically used for removing the medium contained in the slurry applied to the A layer. For example, the medium can be removed by drying after the steps of (a) preparing a solvent that dissolves the medium but not a resin in use and (b) depositing the resin, by immersing a film, which has been formed on the A layer and has not been dried yet, in the solvent and thereby substituting the medium by the solvent. Note that in a case where a slurry liquid is applied to the A layer, the medium or the solvent is dried preferably at a temperature that does not change the air permeability of the A layer.

Note that it is possible to add, to the slurry liquid, at least one additive selected from, for example, the group consisting of a surfactant, a pH adjusting agent, a dispersing agent, and a plasticizing agent, unless such an additive impairs the object of the present invention.

As a method in which the B layer is formed by applying, to the A layer, a coating solution that contains an adhesive material (e.g., fluoride-based resin such as polyvinylidene fluoride-based resin) as a material for formation of the B layer, for example, the following method (hereinafter, may be referred to as "Method 3") can be used.

Specifically, the B layer that is an adhesive layer can be formed on the A layer by (a) applying, directly to the A layer, a coating solution that contains an adhesive material and then (b) solidifying an adhesive resin.

More specifically, a coating solution is first prepared by dissolving an adhesive resin in a solvent. This coating solution is applied to the A layer, and the A layer to which the coating solution has been applied is immersed in a proper coagulating liquid. This causes solidification of the adhesive resin while inducing a phase-separation phenomenon. These steps allow a resultant layer made of the adhesive resin to have a porous structure. The resultant layer is then cleaned with water and dried so that the coagulating liquid will be removed. The B layer, which is an adhesive layer, can be thus formed on the A layer.

The coating solution can be a good solvent that can dissolve the adhesive resin. Suitable examples of the good solvent include polar amide solvents such as N-methylpyrrolidone, dimethylacetamide, and dimethylformamide. From the viewpoint of formation of a good porous structure, it is preferable to mix the good solvent with a phase-separating agent, which induces the phase-separation phenomenon. Examples of the phase-separating agent include water, methanol, ethanol, propyl alcohol, butyl alcohol, butanediol, ethylene glycol, propylene glycol, and tripropylene glycol. Such a phase-separating agent is preferably added in an amount that can ensure viscosity suitable for application of the coating solution. In a case where a filler and/or another additive(s) are added to the B layer which is an adhesive layer, such a filler and/or another additive(s) can be mixed with or dissolved in the above coating solution.

In regard to composition of the coating solution, the coating solution preferably contains an adhesive resin at a concentration of 3 wt % to 10 wt %. From the viewpoint of formation of an appropriate porous structure, it is preferable to use a mixed solvent that contains: not less than 60 wt % of a good solvent; and not more than 40 wt % of a phase-separating agent.

Example of the coagulating liquid include water, a mixed solvent in which water and the good solvent are mixed, and a mixed solvent in which water, the good solvent, and the phase-separating agent are mixed. Among these coagulating liquids, the mixed solvent in which water, the good solvent, and the phase-separating agent are mixed is particularly preferable. In a case where such a particularly preferable mixed solvent is used, it is suitable, from the viewpoint of productivity, to mix the good solvent with the phase-separating agent at a proportion at which the good solvent and the phase-separating agent are mixed in the mixture solvent used for dissolving the adhesive resin. From the viewpoint of formation of a good porous structure and an improvement in productivity, a water concentration of the coagulating liquid is preferably 40 wt % to 90 wt %. From the viewpoint of crystallinity control, preferably, a coagulation temperature is roughly −20° C. to 60° C.

The porous film of the present invention can also be produced by a dry coating method, instead of a wet coating method described above. The dry coating method is a method in which a porous film is obtained by (a) applying, to the A layer, a coating solution that contains an adhesive resin and a solvent and (b) removing the solvent through volatilization by drying the coating solution thus applied. The coating film obtained by the dry coating method, however, is likely to be a dense film, as compared to the coating film obtained by the wet coating method. Thus, it is nearly impossible to obtain a porous layer by the dry coating method unless a filler or the like is added to the coating solution. Even if a filler or the like is added to the coating solution, it is still difficult to obtain a good porous structure. Under such circumstances, in the present invention, it is preferable to use the wet coating method.

In Methods 1 through 3 described above, a coating solution can be prepared by any method that allows preparation of a homogeneous coating solution. Particularly in a case where the coating solution is a slurry, the coating solution is preferably prepared by a method such as a mechanical stirring method, an ultrasonic dispersion method, a high-pressure dispersion method, and a media dispersion method. Among these methods, the high-pressure dispersion method is more preferable because a filler can be easily dispersed more uniformly by the high-pressure dispersion method than the other methods. The order of mixing ingredients of the coating solution during such a mixing operation may be any order, as long as the order poses no particular problem such as generation of a precipitate.

In Methods 1 through 3 (e.g., the step (B) of Method 1 and the step (E) of Method 2), a coating solution (e.g., a polar organic solvent solution or a slurry) that contains a heat-resistant material can be applied to the A layer by any method that allows formation of a uniform wet coating. The method can be a conventionally publicly known method such as a capillary coating method, a spin coating method, a slit die coating method, a spray coating method, a roller coating method, a screen printing method, a flexo printing method, a bar coater method, a gravure coater method, and a die coater method. A thickness of the B layer to be formed can be controlled by adjusting (i) an amount of the polar organic solvent solution or the slurry to be applied, (ii) a concentration of the heat-resistant resin contained in the polar organic solvent solution or the slurry, and/or (iii) in the case of the slurry, a proportion of the filler to the heat-resistant resin. The bar coater method or the die coater method are preferable as a method for applying a high-viscosity coating solution that contains a resin, such as the heat-resistant resin or the adhesive resin. The gravure coater method is preferable as a method for applying a low-viscosity coating solution, such as a heat-resistant composition that contains a filler at a high proportion. Note that while the coating solution is applied to the A layer, the A layer can be supported by a support. Examples of the support include a resin film, a metal belt, a drum, a roller, and the like.

In Methods 1 through 3 (e.g., the step (B) of Method 1 and the step (E) of Method 2), the coating solution that contains a material for formation of the B layer can be applied to the A layer with use of any coating device, which preferably includes an unwrinkling mechanism. More specifically, the unwrinkling mechanism is preferably a bent roller (e.g., bow-like roller, banana-shaped roller, curved roller), a flat expander roller, a helical roller, or a pinch expander. Particularly in a case where the coating solution is applied to the A layer that is not supported by a support, the unwrinkling mechanism has a great effect. Meanwhile, in a case where the coating solution is applied to the A layer that is supported by a support, the unwrinkling mechanism is less effective.

If the coating solution is applied while wrinkles of the A layer is being removed by the unwrinkling mechanism, it will be possible to effectively prevent wrinkles from occurring in the porous film and the roll of the porous film.

The coating device can be a coating device disclosed in Japanese Patent Application Publication Tokukai No. 2001-316006 or a coating device disclosed in Japanese Patent Application Publication Tokukai No. 2002-60102.

Figure 2:
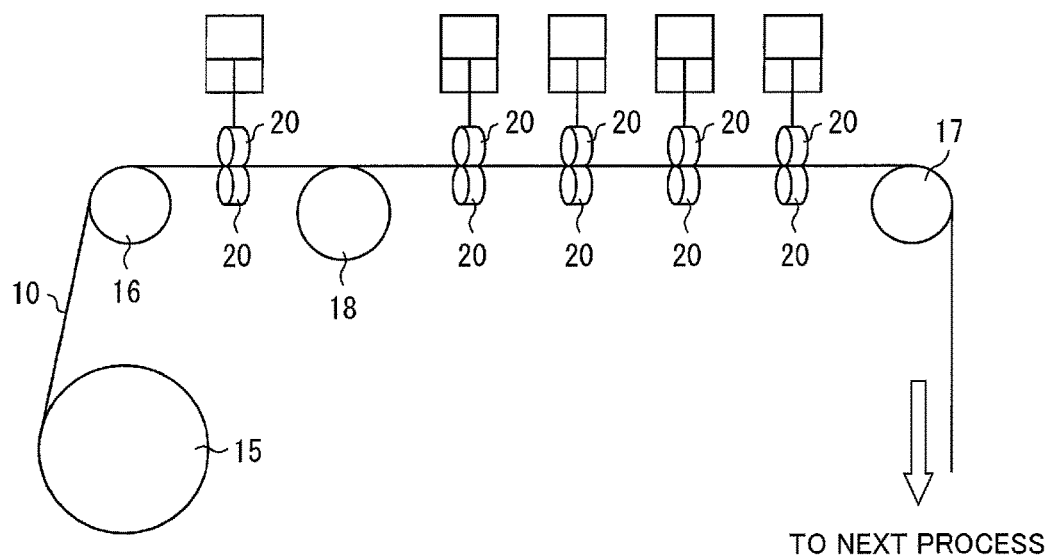
FIG. 2 is a lateral view schematically illustrating a configuration of an example of a coating device of an embodiment of the present invention.
Figure 3:
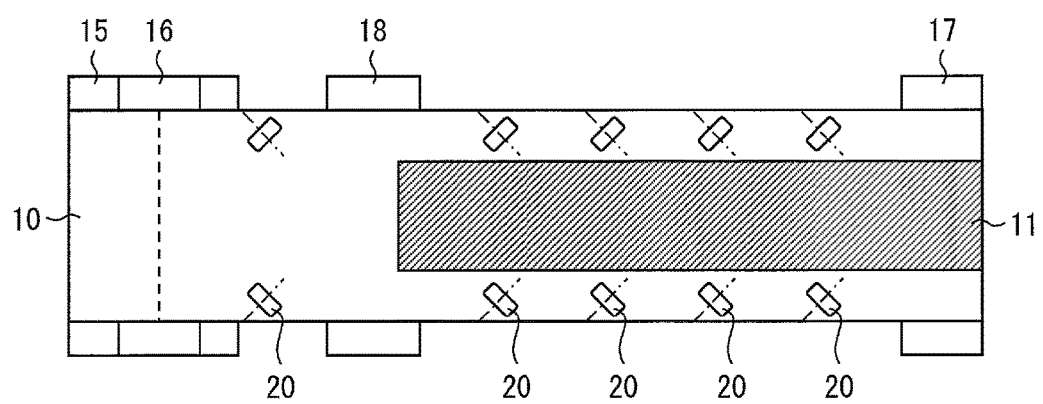
FIG. 3 is a plan view schematically illustrating a configuration of an example of a coating device of an embodiment of the present invention.

FIGS. 2 and 3 each schematically illustrate an example configuration of a specific coating device. The present invention, however, is not limited to such a configuration. Note that FIG. 2 is a lateral view of the coating device, and FIG. 3 is a plan view of the coating device.

The coating device of the present embodiment includes a wind-off machine 15. A base material 10 (A layer) that has been wound off from the wind-off machine 15 is conveyed to a gravure roller 18 via a guide roller 16. The gravure roller 18 applies, to the base material 10, a coating solution 11 for formation of the B layer. The base material 10 to which the coating solution 11 has been applied is then conveyed to the next process via a guide roller 17.

Plural pairs of pressing rollers 20 (pinch expander) are provided between the guide roller 16 and the gravure roller 18 and between the gravure roller 18 and the guide roller 17, so as to sandwich and hold both widthwise end parts of the base material 10. The pressing rollers 20 apply, to the base material 10, tensile force toward outer sides in a width direction, making it possible to prevent a longitudinal wrinkle from being formed on the base material 10.

Note that a dryer for drying the coating solution 11 can be provided between the gravure roller 18 and the guide roller 17, or on a downstream side of the guide roller 17. Further, the dryer can be a dryer that includes pressing rollers or a dryer provided with no pressing rollers. Note that a concrete example of the dryer will be described later.

As illustrated in FIG. 3, the pairs of pressing rollers 20 provided at both widthwise end parts of the base material 10 can be arranged such that a shaft center of each of the pressing rollers 20 is oblique with respect to a conveying direction of the base material 10 and imaginary lines obtained by extension of respective shaft centers of each pair of pressing rollers 20 intersect each other on a downstream side of the each pair of the pressing rollers 20 in the conveying direction of the base material 10. Note that an oblique angle of the shaft center to the conveying direction can be adjusted to a desired angle. With the above configuration, it is possible to more effectively prevent a longitudinal wrinkle from being formed on the base material 10.

The pairs of pressing rollers 20 provided at both widthwise end parts of the base material 10 are configured such that, when the pairs of pressing rollers 20 sandwich and hold the both widthwise end parts of the base material 10, a total of contact lengths Da and Db of contact between the base material 10 and the pressing rollers 20 in the width direction of the base material 10 can be not more than 25%, preferably not more than 15%, and more preferably not more than 10%, relative to a width D of the base material 10. With the above configuration, it is possible to reduce damage to the base material 10 caused by the pressing rollers 20.

From the viewpoint of prevention of deformation and breakage of the base material 10, it is preferable that an outer peripheral surface of each of the pressing rollers 20 be a flat surface or a curved surface so that stress will not be locally concentrated on the base material 10. In such a case, the pressing rollers 20 that are paired so as to sandwich the base material 10 in a thickness direction can have outer peripheral surfaces of identical shapes. Alternatively, each pair of the pressing rollers 20 sandwiching the base material 10 in the thickness direction can be configured such that an outer peripheral surface of one of the pressing rollers 20 is a flat surface and an outer peripheral surface of the other one of the pressing rollers 20 is a curved surface.

It is possible to provide a rubber ring on the outer peripheral surface of each of the pressing rollers 20. This configuration makes a dynamical friction coefficient large between the base material 10 and the pressing rollers 20, and it is therefore possible to reduce a width of each of the pressing rollers 20 (in other words, it is possible to shorten a total of the contact lengths Da and Db). This consequently not only makes it possible to reduce a waste portion of the base material 10 at the both widthwise end parts, which portion cannot be used as a product, but also prevents deformation and breakage of the base material 10 that may occur when the pressing rollers 20 make contact with the base material 10.

In the present embodiment (e.g., in Methods 1 and 3 described above), it is preferable to form a coating layer by the steps of: (a) applying a coating solution to the A layer; (b) depositing or solidifying a polymer by, for example, immersing, in a solvent, the A layer to which the coating solution has been applied in the step (a); and (c) after the step (b), drying the polymer. Meanwhile, in Method 2, it is preferable to form a coating layer by the steps of (a) applying a coating solution to the A layer and (b) drying the coating solution thus applied in the step (a).

The above drying can be performed with use of a typical dryer, and is preferably performed with use of a dryer that includes an unwrinkling mechanism. Examples of such a dryer include a drum dryer. This configuration makes it possible to effectively prevent wrinkles from occurring in the porous film and the roll of the porous film.

Particularly in a case where the B layer is formed as in Methods 1 and 3 by deposition or solidification of the B layer, it is preferable to use a dryer that includes an unwrinkling mechanism. In these methods, the resin is solidified before the drying, so that it is possible to remove wrinkles while the resin is heated with a drum dryer.

Figure 4:
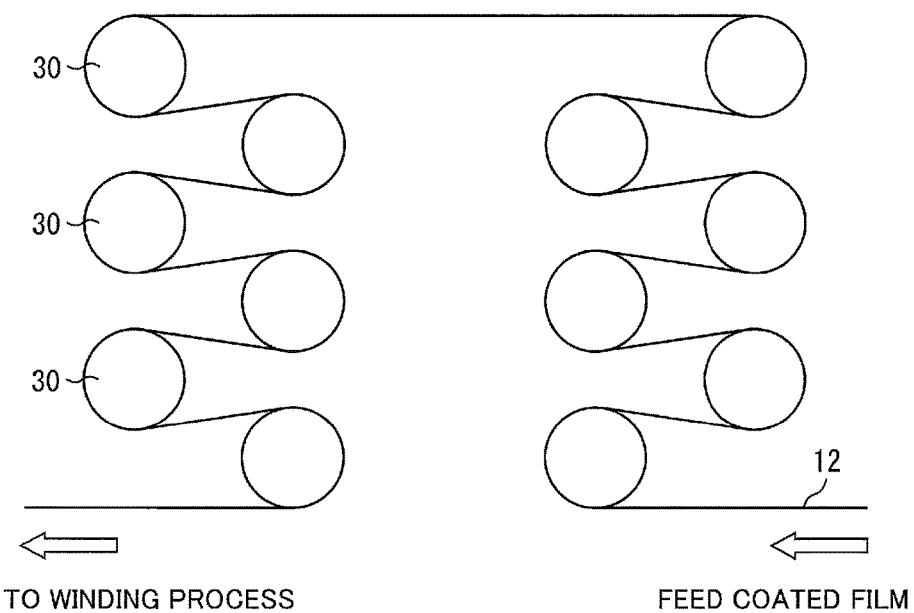
FIG. 4 is a lateral view schematically illustrating a configuration of an example of a dryer of an embodiment of the present invention.

FIG. 4 schematically illustrates an example configuration of a dryer that includes a specific unwrinkling mechanism. The present invention, however, is not limited to such a configuration. FIG. 4 is a lateral view of the dryer, which is generally provided on a downstream side of the guide roller 17.

In the dryer illustrated in FIG. 4, a film 12 (in other words, the A layer to which a coating solution has been applied) is conveyed while being in contact with heating drums 30. The number of the heating drums 30 can be any desired number. A transfer path of the film 12 can also be any desired path. It is possible to dry the film 12 by bringing the film 12 into contact with the heating drums 30.

A conveyance speed of the film 12 is not particularly limited. The conveyance speed is, however, preferably 5 m/min to 180 m/min, more preferably 10 m/min to 150 m/min, and even more preferably 20 m/min to 100 m/min. In a case where the conveyance speed is too low, productivity of the porous film is reduced. Meanwhile, in a case where the conveyance speed is too high, the porous film cannot be sufficiently dried.

Temperatures of the heating drums 30 are not particularly limited, and are preferably 40° C. to 120° C. In a case where the temperature is too low, it may be necessary to increase the number of heating drums 30, or the porous film cannot be sufficiently dried. Meanwhile, in a case where the temperature is too high, the porous film shrinks and thus the air permeability may be increased.

Diameters of the heating drums 30 are not particularly limited, and are preferably 100 mm to 2,000 mm. In a case where the diameters of the heating drums 30 are too large, it is difficult to keep the heating drums 30 at a uniform temperature, and thus the porous film cannot be sufficiently dried. Meanwhile, in a case where the diameter is too small, a contact area between a heating drum 30 and the film 12 becomes small, and thus the porous film cannot be sufficiently dried.

An amount of the tensile force to be applied to the film 12 in the width direction is not particularly limited. The amount of the tensile force is, however, preferably 0.02 MPa to 100 MPa, more preferably 0.5 MPa to 90 MPa, and even more preferably 1 MPa to 80 MPa, per unit sectional area of the film. In a case where the tensile force is too small, wrinkles may be formed in the porous film. Meanwhile, in a case where the tensile force is too large, the porous film may be stretched beyond a proper limit, or may be torn.

Materials of the heating drums 30 are not particularly limited. The heating drums 30 are, however, preferably made of a material that does not cause a chemical change and also has a good thermal conductivity. Examples of such a material include an austenitic stainless steel (specifically, SUS316L).

The roll can be produced (i) by winding the porous film thus prepared, or preferably (ii) by slitting the porous film into a film(s) having a certain width and then winding the film thus slit.

As described above, the roll of an embodiment of the present invention can be produced by appropriately selecting and combining, depending on the configuration of the B layer, (i) a coating device that includes an unwrinkling mechanism and (ii) a dryer that includes an unwrinkling mechanism.

EXAMPLES

The following description will more specifically describe the present invention. The present invention, however, is not limited to the following configurations.

<1. How to Measure Physical Properties Etc. of Porous Film>

(1) Thickness (Unit: μm):

A thickness (entire thickness) of a porous film was measured with use of a high-accuracy digital length measuring machine manufactured by Mitutoyo Corporation. Specifically, a square piece 8 cm on a side was cut out from the porous film. A thickness measurement was performed at 5 points of the square piece of the porous film, and an average of measured values was taken as the thickness of the porous film.

Note that a thickness of the A layer (A layer thickness) was obtained by making a thickness measurement similarly to the above method. A thickness of the B layer (B layer thickness) was obtained by subtracting the A layer thickness from the thickness of the porous film.

(2) Volume Per Unit Area of Heat-Resistant Material (β, Unit: cc/m$^2$):

A square sample 0.08 m on a side was cut out from the porous film, and a weight W (g) of this sample was measured. Similarly, a square sample 0.08 m on a side was cut out from a polyolefin porous film (A layer), and a weight Wa (g) of this sample was measured. Then, a weight Wb (g) of the B layer was calculated by subtracting Wa from W (Wb(g)=W−Wa).

Next, a volume per unit area of the heat-resistant material (a volume of the heat-resistant material contained per 1 m$^2$ of the porous layer (=Wb/(D×S)) was then calculated by dividing the weight Wb (g) of the B layer by an absolute specific gravity D (g/cc) of the heat-resistant material and an area S (m$^2$) (=0.08×0.08) of the sample of the porous film.

(3) Weight Per Unit Area of Heat-Resistant Material (Unit: g/m²):

A weight per unit area (=Wb/S) was calculated in a manner similar to the above method (2).

(4) Air Permeability (Unit: Sec/100 cc):

An air permeability was measured in conformity to JIS P8117, with use of a digital Oken-type air permeability tester manufactured by Asahi Seiko Co., Ltd.

(5) Nail Penetration Test (50% Breakdown Voltage, Unit: V):

A nail penetration test was performed with respect to 10 cylindrical lithium-ion secondary batteries, each of which included the roll of the porous film as a separator. In this nail-penetration test, (a) each of the batteries was charged to a given test voltage, (b) next, a center part of each of the batteries was penetrated with a nail having a diameter of 2.77 mm at a speed of 1 mm/sec, and (c) then, safety of each of the batteries at the given test voltage was evaluated as "Good" or "Poor".

In the evaluation, (i) in cases where abnormal heat generation of a battery occurred and led to a burst or ignition, and/or a lid blowoff of the battery, the safety of the battery was evaluated as "Poor", whereas (ii) in cases where neither burst or ignition nor lid blowoff of a battery occurred or only smoking occurred because abnormal heat generation of the battery was suppressed, the safety of the battery was evaluated as "Good". The nail penetration tests of 10 lithium-ion secondary batteries were performed according to the following procedure.

(A) A first lithium-ion secondary battery was subjected to a nail penetration test at a given test voltage.

(B) In a case where the first lithium-ion secondary battery was evaluated as "Good" in the nail penetration test in the step (A), a second lithium-ion secondary battery was subjected to a nail penetration test at a test voltage that was 0.05 V higher than that used in the nail penetration test in the step (A). Meanwhile, in a case where the first lithium-ion secondary battery was evaluated as "Poor" in the nail penetration test in the step (A), the second lithium-ion secondary battery was subjected to a nail penetration test at a test voltage that was 0.05 V lower than that used in the nail penetration test in the step (A).

(C) In a case where the second lithium-ion battery was evaluated as "Good" in the nail penetration test (B), a third lithium secondary battery was subjected to a nail penetration test at a test voltage that was 0.05 V higher than that used in the nail penetration test (B). Meanwhile, in a case where the second lithium-ion battery was evaluated as "Poor" in the nail penetration test (B), the third lithium secondary battery was subjected to a nail penetration test at a test voltage that was 0.05 V lower than that used in the nail penetration test (B).

(D) The other 7 lithium-ion secondary batteries were subjected one after another to a nail penetration test in which a test voltage was set as in the nail penetration test in the step (C). Note that the nail penetration test was performed with respect to each of the 10 cylindrical lithium-ion secondary batteries. The test voltage (initial test voltage) used in the nail penetration test in the step (A) was set at any voltage between 3.8 V and 4.4 V.

The results of the above tests were used for calculation of a 50% breakdown voltage. The calculation was performed according to a method described in "JIS K 7211 general rules for determination of falling weight impact behavior of rigid plastics". The 50% breakdown voltage thus calculated means a battery voltage of a nonaqueous electrolyte secondary battery at which voltage abnormal heat generation is suppressed though an internal short circuit has been caused by nail penetration. If a battery voltage of a nonaqueous electrolyte secondary battery is not higher than the 50% breakdown voltage in a case where an internal short circuit has occurred due to nail penetration, abnormal heat generation will be suppressed. The 50% breakdown voltage is expressed by the following formula (1).

$$V_{50} = VI + d[\Sigma(i \cdot ni)/N \pm \frac{1}{2}] \quad (1)$$

where:

$V_{50}$ is the 50% breakdown voltage;

VI is a test voltage in a case where a voltage level (i) is 0 (the test voltage at which "Good" and "Poor" coexist and "Poor" is higher in number);

d is a voltage interval (V) at which the test voltage is increased and decreased;

i is a voltage level (i= . . . , −3, −2, −1, 0, 1, 2, 3, . . . ) that increases or decreases by one at a time, assuming that the voltage level is 0 at VI (e.g., i=1 in a case where the test voltage is increased from VI by 0.05 V, whereas i=−1 in a case where the test voltage is decreased from VI by 0.05 V);

ni is the number of batteries that were evaluated as "Good" (or "Poor") in the nail penetration tests at respective voltage levels;

N is a total number (N=Σni) of batteries that were evaluated as "Good (or "Poor") in all nail penetration tests (Note that in regard to whether to use the number (total number) of batteries that were evaluated as "Good" or "Poor", the number to be used is a higher number between the number of batteries evaluated as "Good" and the number of batteries evaluated as "Poor", which were obtained in all the nail penetration tests. In a case where these numbers are the same, either number can be used); and ±½ is +½ in a case where ni and N are each the number (total number) of batteries that were evaluated as "Good", but −½ in a case where ni and N are each the number (total number) of batteries that were evaluated as "Poor".

(6) Roughness Measurement

As illustrated in (a) of FIG. 5, a roll 1 was produced by winding the porous film around a bobbin 2. Then, as illustrated in (a) and (b) of FIG. 5, the roll 1 of the porous film (in other words, a roll of a heat-resistant (stacked) separator for secondary batteries) was conveyed in a width direction (see an arrow illustrated in (a) of FIG. 5, in other words, a direction from a front-surface side to a back-surface side of a sheet of (b) of FIG. 5) while a side surface of the roll 1 was being irradiated with light by use of a laser (LS-7070M, manufactured by Keyence Corporation). In such conditions, a shift amount between A and B from a reference point was measured at 1 mm intervals across an entire width. In a case where there is an inclination between A and B, the inclination was corrected by a least square method (see (c) of FIG. 5), and a shift amount from the reference point was measured. Note that in (b) of FIG. 5, the above laser includes (i) a laser source 3 that emits laser light and (ii) a laser detector 4 that detects laser light.

Then, "maximum shift amount−minimum shift amount" was calculated for a portion within ±10 in the width direction from a widthwise center point of the roll 1. A value thus obtained was taken as a difference between a maximum roughness value and a minimum roughness value for a distance of 20 mm in the width direction.

Further, "maximum shift amount−minimum shift amount" was also calculated for a portion within ±2.5 mm in the widthwise direction from the widthwise center point of the roll 1. A value thus obtained was taken as a difference between a maximum roughness value and a minimum roughness value for a distance of 5 mm in the width direction.

(7) Film Thickness Measurement Under Cross-Sectional Scanning Electron Microscope (SEM)

An outermost porous film of the roll was cut along a transverse direction (TD) by a microtome, and a film section thus cut was collected and observed under a SEM. Such SEM observation was carried out at 4 points in a portion within 110 mm in a width direction from a widthwise center point of the outermost porous film, so that a thickness at each point of the outermost porous film of the roll was measured to an accuracy of 0.1 μm. Then, "maximum thickness−minimum thickness" was calculated by using thickness values measured at the 4 points. A value obtained by this calculation was taken as a difference between a maximum film-thickness value and a minimum film-thickness value for a distance of 20 mm in the width direction.

<2. A Layer>

First, to total 100 parts by weight of a high molecular weight polyethylene powder (GUR4032, manufactured by Ticona Corporation) and a polyethylene wax (FNP-0115, manufactured by Nippon Seiro Co., Ltd.) that had a weight-average molecular weight of 1,000 (70 wt % of the high molecular weight polyethylene powder and 30 wt % of the polyethylene wax), 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added. Then, calcium carbonate (manufactured by Maruo Calcium Co., Ltd.) having an average particle size of 0.1 μm was added so that a content of the calcium carbonate with respect to a total volume would be 38 vol %. After the above powders were mixed with use of a Henschel mixer, a resultant powder mixture was melted and kneaded with use of a twin screw kneading extruder, so that a polyolefin resin composition was obtained.

The polyolefin resin composition was rolled into a sheet by a pair of rollers at a surface temperature of 150° C. This sheet was immersed in a hydrochloric acid aqueous solution (4 mol/L of hydrochloric acid, 0.5 wt % of a nonionic surfactant), so that calcium carbonate was removed. The sheet was then stretched at a given stretch ratio at 105° C. into a polyolefin porous film (A layer) that has a thickness of 16 μm, a porosity of 53%, and an air permeability of 100 sec/100 cc.

<3. B Layer>

<3-1. Ceramic-Forming Slurry>

To a medium which contains pure water and isopropyl alcohol at a weight ratio of 95:5, carboxymethyl cellulose (CMC) (1110, manufactured by Daicel FineChem Ltd., absolute specific gravity: 1.6 g/cm$^3$) and alumina powder (AKP3000, manufactured by Sumitomo Chemical Co., Ltd., absolute specific gravity: 4.0 g/cm$^3$) were added and mixed at a weight ratio of 3:100, so that a solid content concentration was 28 wt %. Then, a resultant mixture was dispersed under high pressure, so that a ceramic-forming slurry was prepared.

<3-2. Aramid-Forming Slurry>

Para-aramid (poly(paraphenylene terephthalamide)) was prepared with use of a 3-liter separable flask equipped with a stirring blade, a thermometer, a nitrogen inlet tube, and a powder addition port.

To a polymerized layer that had been sufficiently dried, 2200 g of N-methyl-2-pyrrolidone (NMP) was introduced, and then 151.07 g of calcium chloride powder, which had been dried in vacuum at 200° C. for 2 hours, was added. A temperature of this mixture was then increased to 100° C., so that the calcium chloride powder was completely dissolved in the NMP. A temperature of this solution was decreased back to room temperature, and then 68.23 g of paraphenylene diamine was added and completely dissolved in the solution.

Further, 124.97 g of terephthalic acid dichloride was divided into 10 parts, which were then added at approximately 5-minute intervals to the solution while the solution was maintained at 20° C.±2° C. The solution was matured while being stirred and maintained at 20° C.±2° C. for 1 hour, so that a para-aramid solution having a para-aramid concentration of 6 wt % was obtained.

To 100 g of the para-aramid solution thus obtained, 243 g of NMP was added, and then a resultant solution was stirred for 60 minutes, so that a para-aramid solution having a para-aramid concentration of 1.75 wt % was obtained.

Meanwhile, 6 g of alumina powder (Alumina C, manufactured by Nippon Aerosil Co., Ltd., absolute specific gravity: 3.2 g/cm$^3$) and 6 g of alumina powder (Advanced Alumina AA-03, manufactured by Sumitomo Chemical Co., Ltd., absolute specific gravity: 4.0 g/cm$^3$) were mixed, so that 12 g of an alumina powder mixture was obtained.

Then, 12 g of the alumina powder mixture was mixed with the para-aramid solution having a para-aramid concentration of 1.75 wt %, and then this mixture was stirred for 240 minutes, so that an alumina powder-containing para-aramid solution was obtained. Then, the alumina powder-containing para-aramid solution was filtered with use of a 1000-mesh metal net. Then, to a resultant filtrate, 0.73 g of calcium oxide was added. A resultant mixture was stirred for 240 minutes for neutralization, and was then defoamed under reduced pressure, so that an aramid-forming slurry was obtained.

<4. Preparation of Porous Film>

<4-1. Preparation of Porous Films of Examples 1, 2, and 4 Through 6>

The ceramic-forming slurry was directly applied to (i) one surface (Examples 1, 4, and 5) or both surfaces (Examples 2 and 6) of the A layer, which had been subjected to the corona treatment with use of a gravure coating machine, while the A layer was being conveyed through pinch rollers (pinch expander). The A layer and the ceramic-forming slurry having been applied to the A layer were then dried at a temperature of 70° C.

As a result, a porous film having a predetermined thickness was obtained, which porous film included the A layer and a ceramic layer which was stacked on one or both surfaces of the A layer. Table 1 shows physical properties of this porous film as a result of measurement by the method described above. The porous film was then slit into pieces of 60.9 mm in width. Each piece was wound around a bobbin having an inner diameter of 3 inches and an outer diameter of 6 inches, so that a roll was obtained.

<4-2. Preparation of Porous Film of Example 3>

A roll (width: 300 mm, length: 300 m) of the A layer was attached to a wind-off machine. Then, while the A layer was being pulled out, the aramid-forming slurry was applied to one surface of the A layer, so that a porous film was continuously produced.

Specifically, NMP was applied to a lower surface of a pulled-out portion of the A layer with use of a micro-gravure coater. The aramid-forming slurry was then applied to a given thickness to an upper surface of the A layer with use of a bar coater.

Next, the A layer thus coated was conveyed through a constant temperature/humidity chamber (temperature: 50° C., relative humidity: 70%), so that para-aramid was deposited from a coating film of the aramid-forming slurry. This film was then conveyed through a water cleaning device (device having such a structure that a guide roller is set in a chamber (i) into which ion exchange water is injected at an injection rate of 10 liters/minute and (ii) from which the ion exchange water filling the inside of the chamber is discharged at a rate identical to the injection rate), so that NMP and calcium chloride were removed from the A layer.

Then, while a dryer was blowing hot air at the porous film thus cleaned, the film was conveyed through a heat roller (drum dryer) (diameter: 1 m, surface temperature: 70° C.), so that moisture was removed by drying.

As a result, a porous film having a predetermined thickness was obtained, which porous film included the A layer and an aramid layer stacked on one surface of the A layer. Table 1 shows physical properties of this porous film as a result of measurement by the method described above. The porous film was then slit into pieces of 60.9 mm in width. Each piece was wound around a bobbin having an inner diameter of 3 inches and an outer diameter of 6 inches, so that a roll was obtained.

<4-3. Preparation of Porous Films of Comparative Examples 1 through 3>

The ceramic-forming slurry was directly applied to both surfaces of the A layer, which had been subjected to the corona treatment, with use of a gravure coating machine. The A layer was not allowed to pass through pinch rollers when the slurry was applied to the A layer. The A layer and the ceramic-forming slurry having been applied to the A layer were then dried.

As a result, a porous film having a certain thickness was obtained, which porous film included the A layer and ceramic layers stacked on both surfaces of the A layer. Table 1 shows physical properties of this porous film as a result of measurement by the method described above. The porous film was slit into pieces of 60.9 mm in width. Each piece was wound around a bobbin having an inner diameter of 3 inches and an outer diameter of 6 inches, so that a roll was obtained.

$LiCoO_2$, absolute specific gravity: 4.8 g/cm$^3$), an electrically conductive agent (acetylene black, manufactured by Denki Kagaku Kogyo Kabushiki Kaisha, absolute specific gravity: 2.2 g/cm$^3$), a binder 1 (PTFE31-JR, manufactured by Du Pont-Mitsui Fluorochemicals Company, Ltd., absolute specific gravity: 2.2 g/cm$^3$), and a binder 2 (CELLOGEN 4H, manufactured by DKS Co. Ltd., absolute specific gravity: 1.4 g/cm$^3$) were weighed so that a mixing ratio (cathode active material:electrically conductive agent:binder 1:binder 2) would be 92:2.7:4.55:0.75 (weight ratio) in a resultant composition.

A certain amount of water was provided in a kneader so as to dissolve the binder 2 in the water. Then, the cathode active material, the electrically conductive agent, and the binder 1 were added, and a resultant mixture was kneaded. Further, water was added to a kneaded product, so that the kneaded product had a viscosity of 2700±1000 cp. A cathode mix was thus obtained.

The cathode mix was applied to predetermined parts on both sides of an aluminum foil, which served as a cathode current collector sheet. This aluminum foil had a thickness of 20 μm, and was provided with no pores. Then, after the cathode mix was dried, a dried product was rolled with use of a roller press until a thickness of a coating film reached a thickness of 140 μm (apparent density: 3.5 g/cm$^3$). As a result, a cathode having a width of 54 mm was obtained.

<5-2. Preparation of Anode>

An anode was prepared with use of an anode active material 1, an anode active material 2, a binder, and water.

First, the anode active substance 1 (BF15SP, manufactured by Chuetsu Graphite Works Co., Ltd., absolute specific gravity: 2.2 g/cm$^3$), the anode active substance 2 (CG-R-A, manufactured by Nippon Graphite Industries, Ltd., absolute specific gravity: 2.2 g/cm$^3$), and the binder (CELLOGEN 4H, manufactured by DKS Co. Ltd., absolute specific gravity: 1.4 g/cm$^3$) were weighed so that a mixing ratio (anode active material 1:anode active material 2:binder) would be 58.8:39.2:2 (weight ratio) in a resultant composition.

A certain amount of water was provided in a kneader so as to dissolve the binder in the water. Then, the anode active material 1 and the anode active material 2 were added, and

TABLE 1

| | Weight per Unit Area [g/m$^2$] | Volume per Unit Area [cc/m$^2$] | Film Resistance [Ω · cm$^2$] | Coated Surface of Heat-Resistant Layer | Unwrinkling Mechanism | Heat-Resistant Layer (B Layer) | Base Material (A Layer) |
|---|---|---|---|---|---|---|---|
| Example 1 | 6.3 | 1.6 | 0.91 | One Side | Pinch Roller | Ceramic | Polyethylene 16 μm |
| Example 2 | 14.2 | 3.7 | 0.98 | Both Side | Pinch Roller | Ceramic | |
| Example 3 | 2.8 | 1.2 | 1.06 | One Side | Drum Dryer | Aramid | |
| Example 4 | 4.0 | 1.0 | 0.93 | One Side | Pinch Roller | Ceramic | |
| Example 5 | 10.4 | 2.7 | 0.95 | One Side | Pinch Roller | Ceramic | |
| Example 6 | 9.4 | 2.5 | 0.88 | Both Sides | Pinch Roller | Ceramic | |
| Comparative Example 1 | 15.1 | 4.0 | 0.95 | Both Sides | None | Ceramic | |
| Comparative Example 2 | 20.5 | 5.4 | 1.07 | Both Sides | None | Ceramic | |
| Comparative Example 3 | 16.6 | 4.4 | 0.95 | Both Sides | None | Ceramic | |

<5. Production of Lithium-Ion Secondary Battery>

<5-1. Preparation of Cathode>

A cathode was prepared with use of a cathode active material, an electrically conductive agent, a binder 1, a binder 2, and water.

First, a cathode active material (CELLSEED C-10N, manufactured by Nippon Chemical Industrial Co., Ltd., a resultant mixture was kneaded. Further, water was added to a kneaded product, so that the kneaded product had a viscosity of 2100±500 cp. An anode mix was thus obtained.

The anode mix was applied to predetermined parts on both sides of a copper foil, which served as an anode current collector sheet. This copper foil had a thickness of 1.2 μm, and was provided with no pores. Then, after the anode mix was dried, a dried product was rolled with use of a roller press until a thickness of a coating film reached 140 μm (apparent density: 1.45 g/cm³). As a result, an anode having a width of 56 mm was obtained.

<5-3. Production of Battery>

Each of the porous films (width: 60.9 mm, length: 700 mm) prepared in Examples 1 through 6 and Comparative Examples 1 through 3 as a separator was used for production of a battery, together with (i) the cathode (width: 54 mm, length: 560 mm) to which a cathode tab (aluminum) had been welded and (ii) the anode (width: 56 mm, length: 600 mm) to which an anode tab (nickel) had been welded. The cathode, the porous film, and the anode were stacked in this order, and were wound.

An electrode group thus obtained was necked on a bench lathe while being placed in a battery can for a 18650 cylindrical battery. After the anode tab was welded to a bottom of the battery can and the cathode tab was welded to a lid, vacuum drying was performed.

Thereafter, approximately 5 g (equivalent to 1.1 times a total volume of pores in the cathode, the anode, and the porous film) of a nonaqueous electrolyte (manufactured by Kishida Chemical Co., Ltd., specific gravity: 1.21 g/cm³), in which 1.3 mol/L of LiPFf, salt was contained in a carbonate solvent, was poured in the battery can in a glove box in an atmosphere of argon gas. Then, the battery can was sealed up by a swaging machine, so that a lithium-ion secondary battery (18650 cylindrical battery) was obtained.

<6. Test Results (Film Thickness Measurements)>

Measurement results of respective thicknesses of the above layers will be shown below.

TABLE 2

| Comparative Example 1 | Measurement Point 1 | Measurement Point 2 | Measurement Point 3 | Measurement Point 4 |
|---|---|---|---|---|
| A Layer Thickness [μm] | 16.4 | 16.5 | 17.0 | 17.0 |
| B Layer Thickness on First Coated Surface [μm] | 3.4 | 5.3 | 3.5 | 5.4 |
| B Layer Thickness on Second Coated Surface [μm] | 3.9 | 3.9 | 3.9 | 3.6 |
| Total B Layer Thickness [μm] | 7.3 | 9.2 | 7.4 | 9.0 |
| Laminated Porous Film Thickness [μm] | 23.7 | 25.7 | 24.4 | 26.0 |

TABLE 3

| Comparative Example 2 | Measurement Point 1 | Measurement Point 2 | Measurement Point 3 | Measurement Point 4 |
|---|---|---|---|---|
| A Layer Thickness [μm] | 16.6 | 17.4 | 16.9 | 16.2 |
| B Layer Thickness on First Coated Surface [μm] | 4.6 | 7.3 | 5.1 | 6.7 |
| B Layer Thickness on Second Coated Surface [μm] | 5.2 | 6.3 | 6.3 | 6.8 |
| Total B Layer Thickness [μm] | 9.8 | 13.6 | 11.4 | 13.5 |
| Laminated Porous Film Thickness [μm] | 26.4 | 31.0 | 28.3 | 29.7 |

TABLE 4

| Example 2 | Measurement Point 1 | Measurement Point 2 | Measurement Point 3 | Measurement Point 4 |
|---|---|---|---|---|
| A Layer Thickness [μm] | 16.3 | 17.0 | 16.5 | 16.8 |
| B Layer Thickness on First Coated Surface [μm] | 4.4 | 3.4 | 4.1 | 3.5 |

TABLE 4-continued

| Example 2 | Measurement Point 1 | Measurement Point 2 | Measurement Point 3 | Measurement Point 4 |
|---|---|---|---|---|
| B Layer Thickness on Second Coated Surface [μm] | 3.6 | 3.5 | 4.1 | 4.2 |
| Total B Layer Thickness [μm] | 8.0 | 6.9 | 8.2 | 7.7 |
| Laminated Porous Film Thickness [μm] | 24.3 | 23.9 | 24.7 | 24.5 |

TABLE 5

| Example 4 | Measurement Point 1 | Measurement Point 2 | Measurement Point 3 | Measurement Point 4 |
|---|---|---|---|---|
| A Layer Thickness [μm] | 16.7 | 18.1 | 17.1 | 16.4 |
| B Layer Thickness on First Coated Surface [μm] | 1.8 | 2.0 | 2.0 | 2.3 |
| B Layer Thickness on Second Coated Surface [μm] | — | — | — | — |
| Total B Layer Thickness [μm] | 1.8 | 2.0 | 2.0 | 2.3 |
| Laminated Porous Film Thickness [μm] | 18.5 | 20.1 | 19.1 | 18.7 |

<7. Test Results (50% Breakdown Voltages)>

The cylindrical lithium-ion secondary batteries obtained in <5-3> were each subjected to the nail penetration test by the method described above, and respective 50% breakdown voltages of the batteries were calculated. Table 6 and FIGS. 6 and 7 each show results of the calculation. Note that each "breakdown voltage β without influence of A layer" was obtained by subtracting a 50% breakdown voltage in a case where an A layer film alone was used in a porous film for a battery, from a 50% breakdown voltage in a case where each of the porous films prepared in Examples 1 through 6 and Comparative Examples 1 through 3 was used for a battery.

In Examples 1 to 6, the B layer contained a heat-resistant material. It is known that a porous film having a layer that contains a heat-resistant material has a 50% breakdown voltage proportional to a volume per unit area of the layer containing a heat-resistant material. In view of this, a "β/volume per unit area of B layer" was calculated for each of Examples and Comparative Examples for the purpose of excluding an influence of the volume per unit area, and calculation results were compared. A result of this comparison showed that the "β/volume per unit area of B layer" of each of the batteries prepared in Examples 1 through 6 was higher than those of the batteries prepared in Comparative

TABLE 6

|   | 50% Breakdown Voltage β Without Influence of A Layer [V] | Difference Between Maximum Roughness Value and Minimum Roughness Value for Distance of 5 mm in Width Direction [μm] | Difference Between Maximum Roughness Value and Minimum Roughness Value for Distance of 20 mm in Width Direction [μm] | Difference Between Maximum Film-Thickness Value and Minimum Film-Thickness Value for Distance of 20 mm in Width Direction [μm] | β/Volume per Unit Area of B Layer |
|---|---|---|---|---|---|
| A Layer Alone | 0 | — | — | — | — |
| Example 1 | 0.127 | 3 | 9 | — | 0.079 |
| Example 2 | 0.227 | 5 | 14 | 0.8 | 0.061 |
| Example 3 | 0.107 | 5 | 10 | — | 0.089 |
| Example 4 | 0.092 | 2 | 13 | 1.6 | 0.089 |
| Example 5 | 0.207 | 5 | 17 | — | 0.076 |
| Example 6 | 0.132 | 4 | 13 | — | 0.054 |
| Comparative Example 1 | 0.147 | 24 | 30 | 2.3 | 0.037 |
| Comparative Example 2 | 0.192 | 86 | 94 | 4.6 | 0.036 |
| Comparative Example 3 | 0.137 | 19 | 45 | — | 0.031 |

Examples 1 through 3, and therefore, that the batteries prepared in Example 1 through 6 were highly safe even in a case where an internal short circuit had occurred.

INDUSTRIAL APPLICABILITY

The present invention can be widely used in the field of production of a battery (e.g., nonaqueous electrolyte secondary battery) that can ensure high safety. More specifically, the present invention can be widely used in the field of production of a separator for a battery (e.g., nonaqueous electrolyte secondary battery).

REFERENCE SIGNS LIST

1 Roll
2 Bobbin
3 Laser source
4 Laser detector
5, 6, and 7 Arrow
10 Base material
11 Coating solution
12 Film
15 Wind-off machine
16, 17 Guide roller
18 Gravure roller
20 Pressing roller
30 Heating drum

The invention claimed is:

1. A separator roll for a secondary battery, which separator roll is made of a porous film in a belt-like shape, the porous film having a width of not smaller than 20 mm, wherein:

in a case where roughness along a width direction of an outermost surface of the roll is measured at 1 mm intervals across an entire width of the outermost surface, a difference between a maximum roughness value and a minimum roughness value for a distance of 20 mm in the width direction of the outermost surface is less than 25 μm, the porous roll includes a first layer that imparts a shutdown function and a coating layer that is formed on the first layer; and a volume per unit area of the coating layer is 1.0 cc/m$^2$ to 3.7 cc/m$^2$ and the weight per unit area of the coating layer is 2.8 g/m$^2$ to 14.2 g/m$^2$.

2. The separator roll as set forth in claim 1, wherein:
a difference between a maximum film-thickness value and a minimum film-thickness value for a distance of 20 mm in an width direction of an outermost porous film of the roll is not more than 1.6 μm.

3. The separator roll as set forth in claim 1, wherein:
the first layer is a polyolefin-containing layer.

4. A method for producing the separator roll according to claim 1, comprising:
forming the coating layer with a coating device that includes an unwrinkling mechanism.

5. The method as set forth in claim 4, wherein:
the unwrinkling mechanism is a pinch expander.

6. The method as set forth in claim 4, further comprising:
drying the coating layer using a dryer.

7. The method as set forth in claim 6, wherein:
the dryer is a drum dryer.

* * * * *